June 17, 1969  L. G. JORGENSEN  3,450,589
FILM SPLICING APPARATUS
Filed Nov. 18, 1964  Sheet 1 of 5
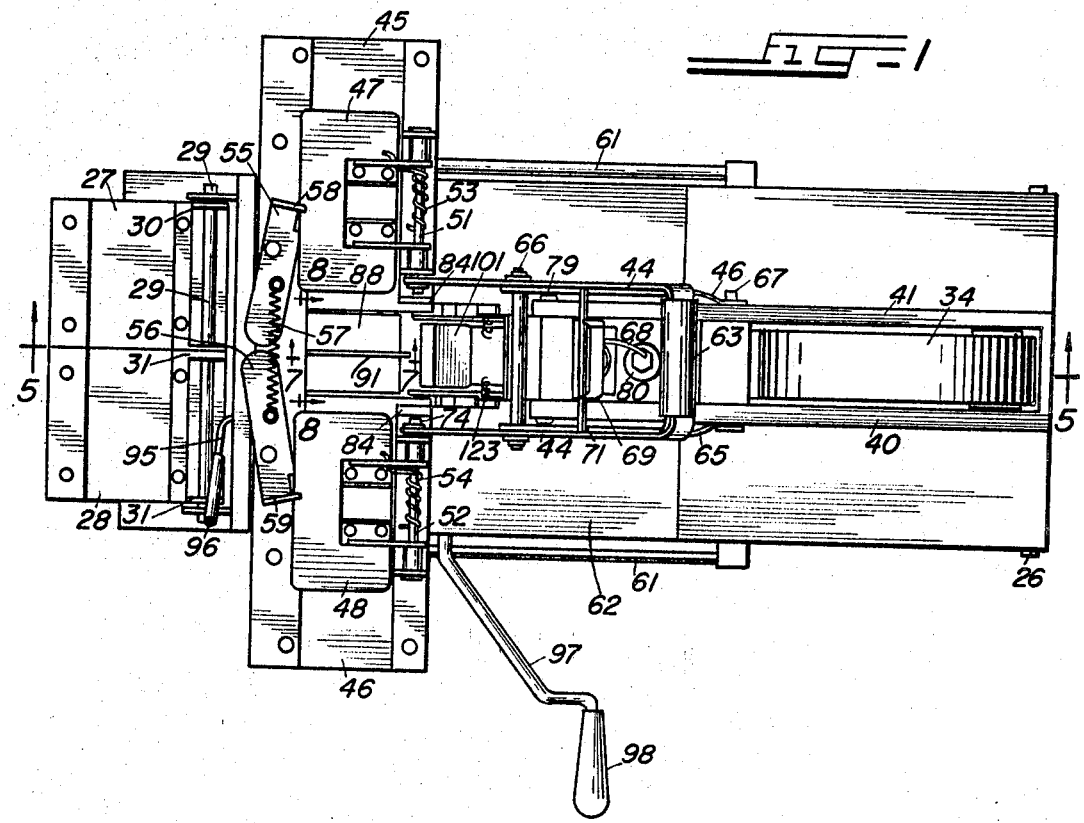
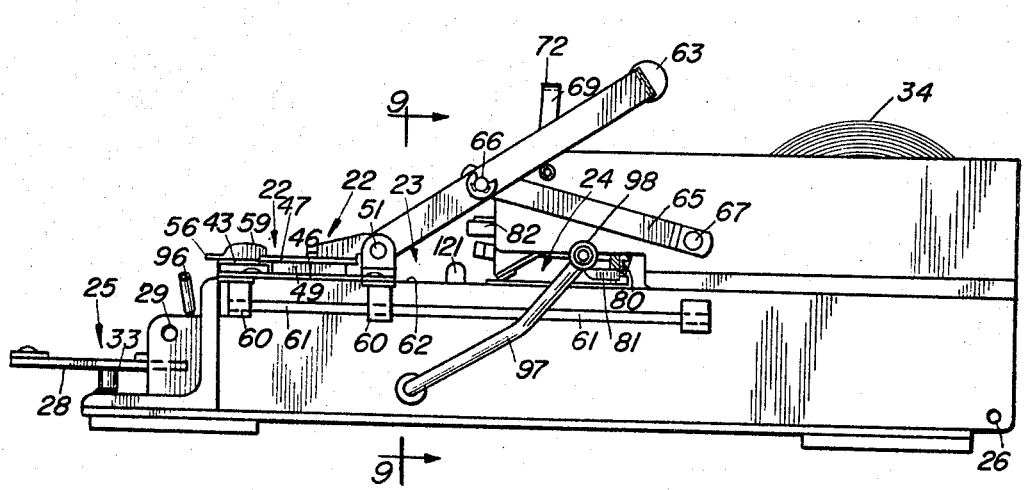
INVENTOR.
LEIF G. JORGENSEN

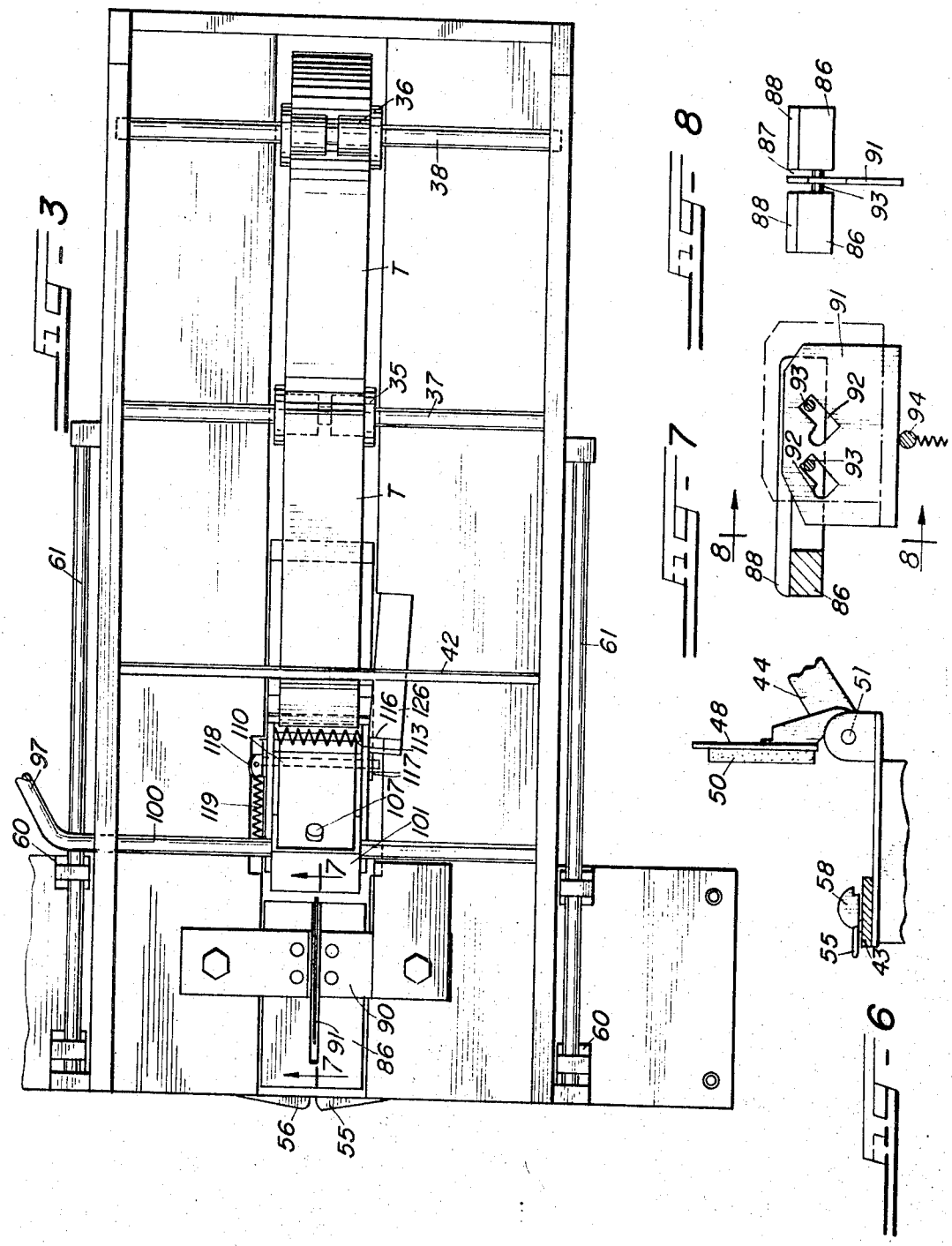

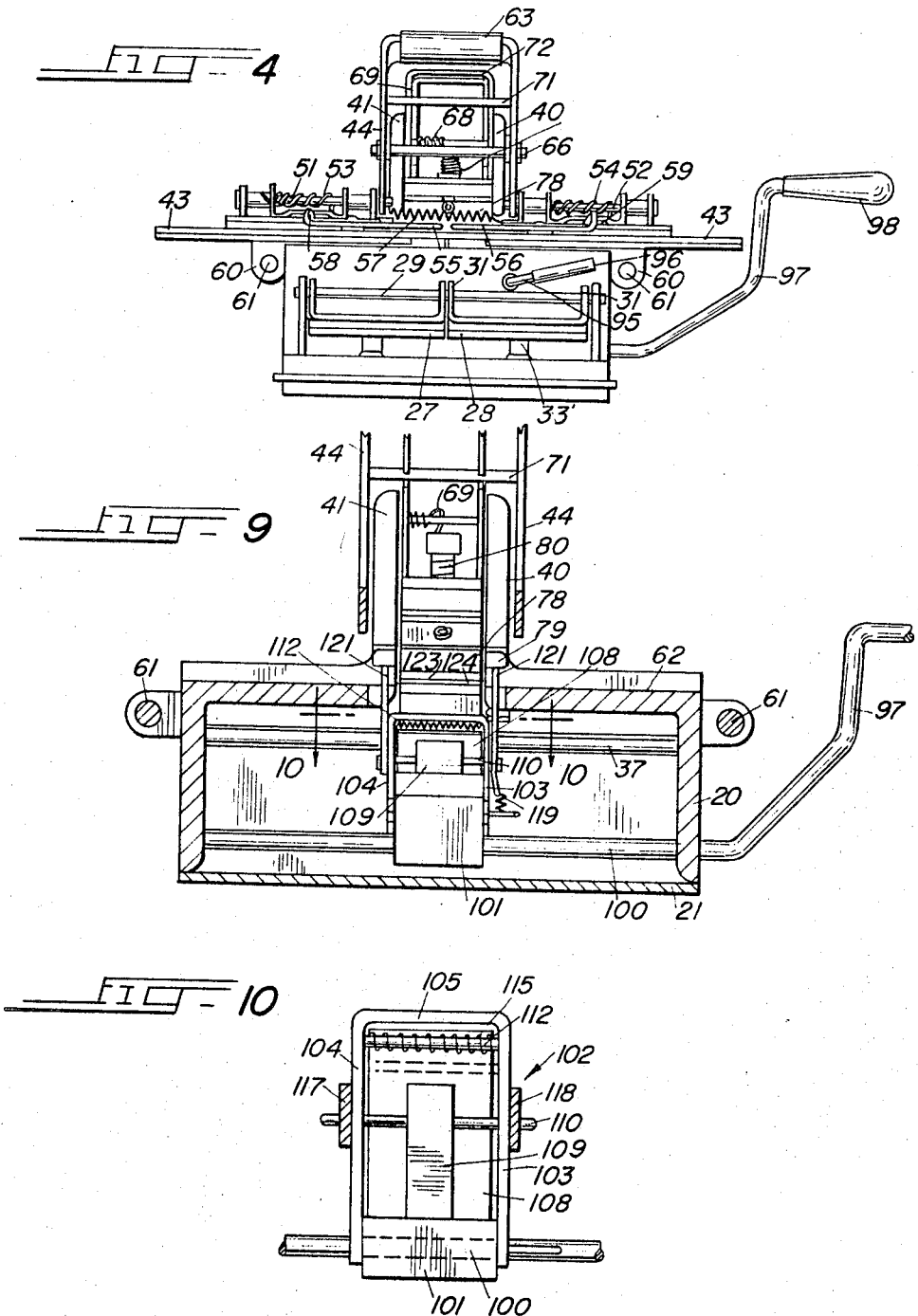

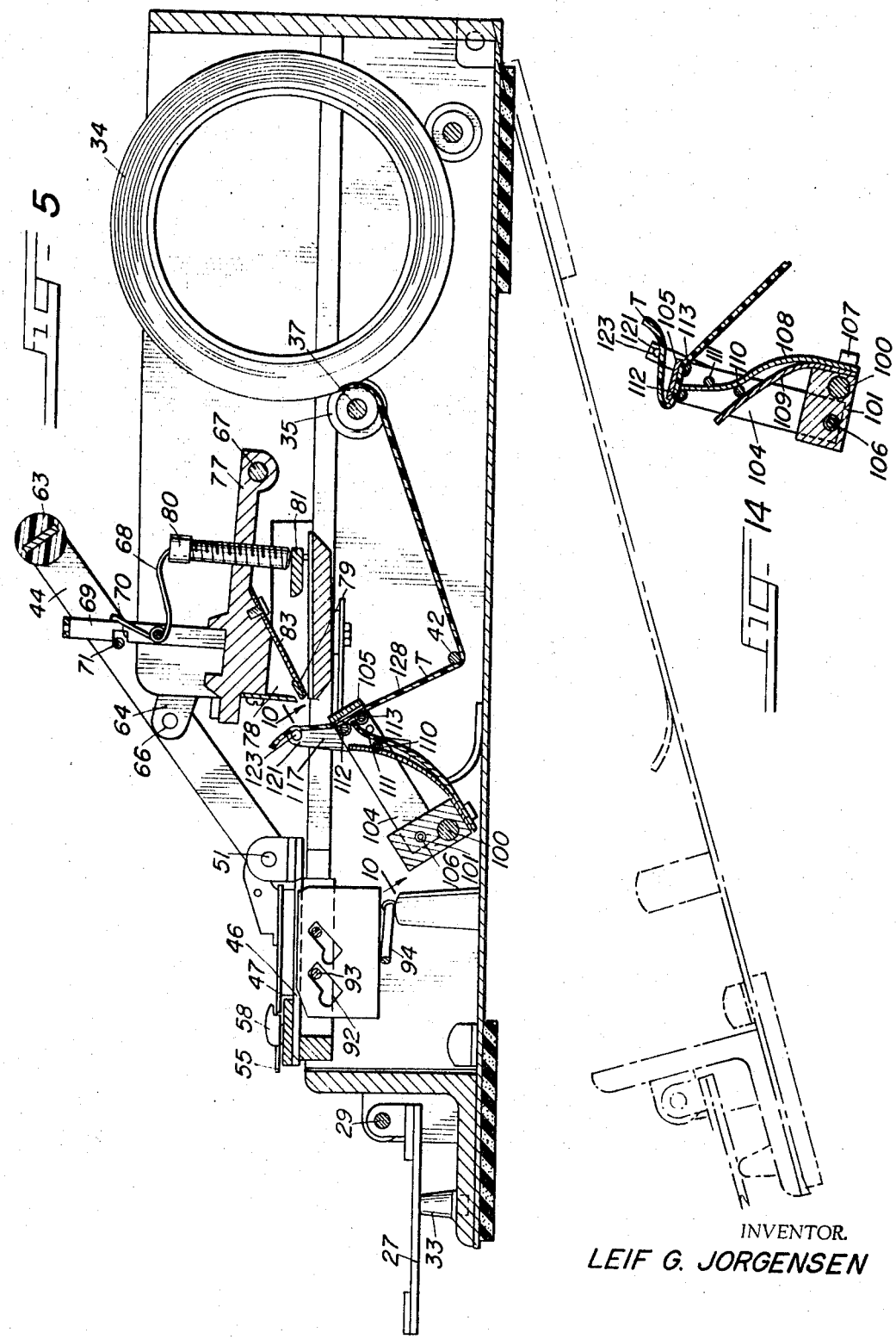

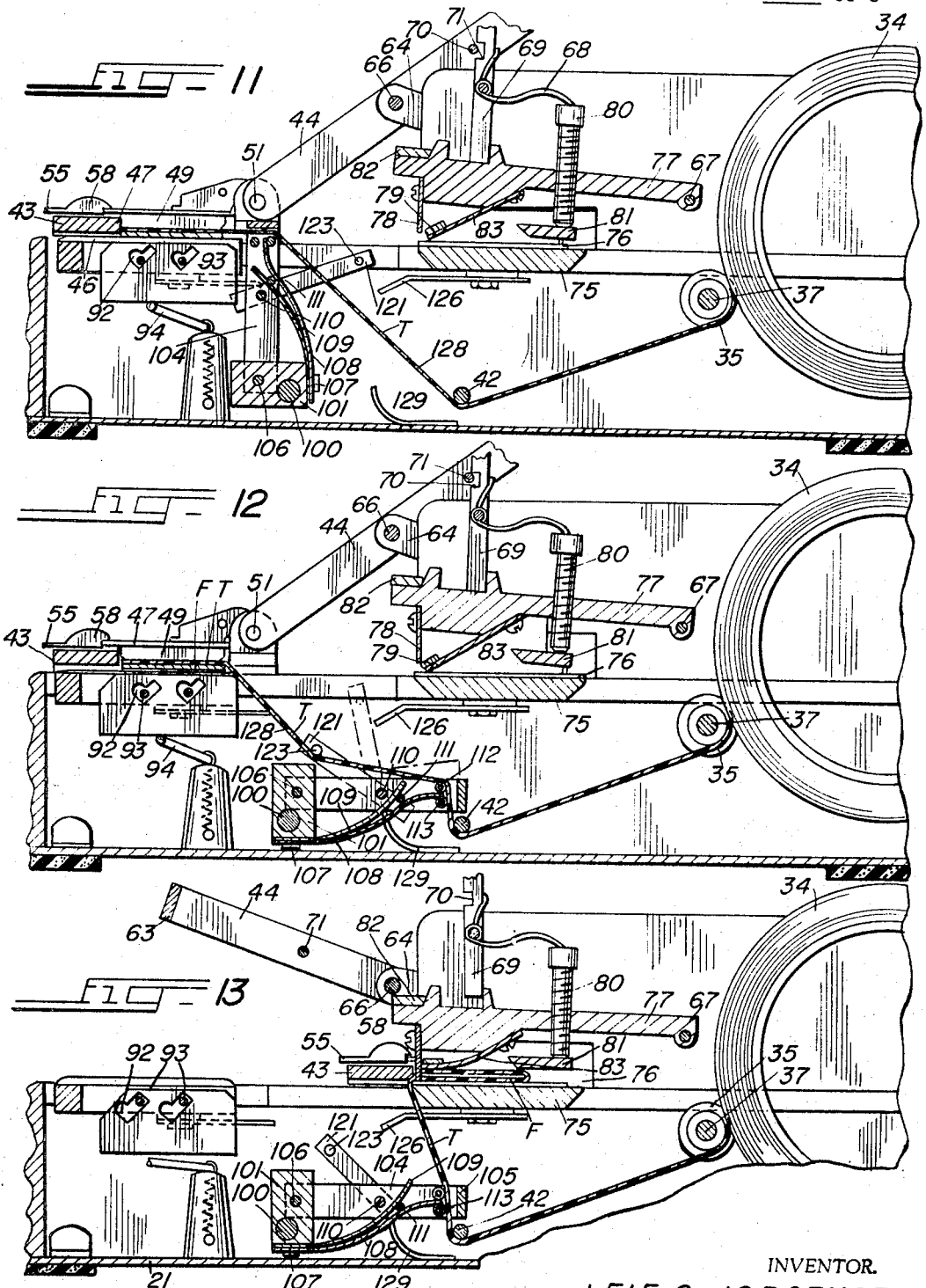

United States Patent Office 3,450,589
Patented June 17, 1969

3,450,589
FILM SPLICING APPARATUS
Leif G. Jorgensen, Lombard, Ill., assignor to Dupage Metal Products Company, Inc., Lombard, Ill., a corporation of Illinois
Filed Nov. 18, 1964, Ser. No. 412,170
Int. Cl. B65h 69/02
U.S. Cl. 156—505                   19 Claims

ABSTRACT OF THE DISCLOSURE

An apparatus for applying splicing tape to the top and bottom surfaces of a pair of abutting film strip ends wherein the film is held on a film holding means mounted on a frame structure for movement between first and second stations which includes tape feeding means for gripping a free end of said tape and delivering it to the film, which tape feeding means includes means for lifting the tape into a position overlying the film while the holding means is at said first station; releasably holding said tape under said holding means as said holding means is moved from said first to said second station; and maintaining tension on said tape to facilitate application of the tape to said film.

---

The present invention relates to a film splicing unit, and more particularly to an apparatus for dispensing, folding and cutting off adhesive tape used in splicing or joining photographic film together in an abutting relationship. The present invention provides an apparatus which operates by dispensing and disposing a piece of adhesive tape over the joint formed by the abutment of adjacently disposed sections of film, affixing the adhesive tape over one surface of the joint, folding the tape over to cover the other surface of the film, cutting off the film at the desired point adjacent the edge of the film, and returning the operating components of the film splicing apparatus to a position suited for subsequent repetition of the operating cycle.

The apparatus of the present invention is designed for splicing moving picture film or large numbers of rolls of still film together, in a precise, predetermined relationship. Because such operation is normally carried out in total or substantially complete darkness, there has been a need for an apparatus which may be readily and simply manipulated by hand to achieve a precise splicing of the film in question, under conditions of substantially complete darkness.

There is also a need for an inexpensive, hand-operated apparatus or machine, for rapidly and effectively splicing film segments together.

Several problems have been encountered with film splicing units of the prior art, as will be pointed out herein, and the nature of these units, as well as the nature of the film developing process, has created a need for a simple and effective film splicer which overcomes some of these disadvantages.

When films are developed commercially, it is customary to do so by a continuous machine process, which involves passing the film through a great number of solutions or baths, to bring about development of the film. In the case of color films, especially a great number of operations are required. Accordingly, it is a normal practice in such developing to splice a large number of rolls of film together into one very large continuous roll, so that the continuous developing process is facilitated.

In the case of color development of 35 mm. film, for example, several hundred rolls may be spliced together for one "run" through the developer and fixer baths. Accordingly, such a spliced roll of film might have several hundred joints therein, and if these joints are formed such that there are small, liquid-trapping "envelopes" along the side portions of the film where the tape is adhered, liquid will be transported from one bath to the succeeding bath. Transfer of liquid in this manner accordingly undesirably rapidly weakens and destroys the effectiveness of the developers, and renders the developing process unsatisfactory.

Accordingly, it is an object of the present invention to provide a splicer which will form a very tight joint without forming undesirable, liquid-retaining envelopes or pockets therein.

It is a further object of the invention to provide an apparatus for film splicing which will perform the cutting of the tape at a film edge, and minimize the number of "envelopes" formed in the splicing operation.

Another object of the present invention is to provide a novel film splicing apparatus which includes movable operating means for cutting the film, for indexing the sections of the film in a desired abutting relationship, for securing the film in such relationship, for dispensing a desired amount of tape and securing the tape over one surface of the film, and for subsequently wrapping the tape or splicing material around the other surface of the film, of cutting the tape at the end of the operation and returning the movable operating means to its original position.

It is a further object of the present invention to provide a film splicing apparatus which includes means for holding a roll of adhesive tape therein.

It is an additional object of the invention to provide a simple, hand operable machine, which is capable of rapidly and accurately splicing pieces of film in a desired abutting relationship, to provide a machine which makes it possible to perform the operating steps in total darkness by reason of having each part of the machine identifiable by the distinctive contours of the portion in question, or the location thereof relative to other portions of the apparatus.

It is an additional object of the invention to provide an apparatus for splicing moving picture and like film which is readily operable in the dark by a series of simple hand manipulations.

Another object of the present invention is to provide a film splicing apparatus which will meter and dispense a precise quantity of tape from a roll thereof, and insure its rapid and proper adhesion over a pair of abutting film strips in a desired pre-determined relation.

These objects, and other objects and advantages of the present invention, including the advantages inherent therein, will be more apparent when considered in conjunction with a description of a preferred embodiment of the invention, which includes what I now contemplate to be the best method of applying the same, and by reference to the accompanying drawings in which:

FIG. 1 is a top plan view of the splicing apparatus of the present invention;

FIG. 2 is a side elevational view of the splicing apparatus of the present invention;

FIG. 3 is a bottom plan view of the interior of the splicing apparatus;

FIG. 4 is a front elevational view of the film splicing unit of the present invention;

FIG. 5 is a vertical sectional view, taken along lines 5—5 of FIG. 1 and showing certain aspects of the operation of the novel film splicing unit, and in phantom lines, the opened position of the bottom element of this apparatus;

FIG. 6 is an enlarged vertical sectional view of the film holder portion of the present invention;

FIG. 7 is an enlarged vertical sectional view of the film abutment guide element of the present invention taken along lines 7—7 of FIG. 1;

FIG. 8 is a front elevational view of the film abutment guide element of FIG. 7, and taken along lines 8—8 thereof;

FIG. 9 is a vertical sectional view of the film splicing apparatus of FIGS. 1 and 2 and taken along lines 9—9 in FIG. 2;

FIG. 10 is a sectional view of a portion of the tape feeding mechanism of the invention taken looking downwardly and rearwardly along lines 10—10 of FIG. 5;

FIG. 11 is a vertical sectional view of a portion of the apparatus of the present invention, and showing one step in the operational cycle of the apparatus;

FIG. 12 is also a vertical sectional view of a portion of the invention, similar to FIG. 11, but showing another phase of the operational cycle of the film splicing apparatus;

FIG. 13 is also a vertical sectional view of a portion of the invention, similar to FIGS. 11 and 12, but showing another and additional phase of the operational cycle of the apparatus of the present invention; and FIG. 14 is a vertical sectional view of the tape feeding and dispensing apparatus of the present invention.

As referred to herein, both in the specification and the claims, the apparatus is considered oriented as shown in FIGS. 1 and 2 with the front end being shown on the left and the rear on the right.

A preferred embodiment of the present invention, in general, includes a lower base member 20, an upper base member 21 pivotally mounted thereon, but ordinarily stationary in use relative to the lower base member, a composite film holder unit 22, reciprocably mounted on the upper base member 21, a tape dispensing and feeding assembly 23, and a tape folding and cutting unit 24.

Additionally, the machine may include a film cutter mechanism 25, preferably attached to the front portion of the lower base member 20.

In operation, the apparatus is generally employed by cutting the film with the film cutting mechanism 25 in the desired place, placing the two sections of the film in the reciprocable film holder unit 22, causing tape to issue from the dispensing and feeding assembly 23, covering the top portion of the film with the tape, withdrawing the feeding assembly, and then reciprocating the film holder unit 22 to the rear and into operative engagement with the tape folding and cutting assembly 24, and returning the reciprocable film holder unit 22 to its original position, whereupon the film may be removed therefrom, spliced together in the desired relationship.

Referring now to the invention in greater detail, it is shown that the lower base member 20 is attached to the upper base member 21 by a rear pivot rod 26, and that the film cutter mechanism 25 in the front end of the lower base member 20 includes left and right hand cutter elements 27 and 28, pivotally mounted by means of a support rod 29 extending through the eyes 30 in the cutter element extensions 31. Bosses 32 are integrally formed with the lower base member 20 to hold the support rod 29. Horizontal alignment of the cutter elements 27, 28 is maintained by contact of the cutters 27, 28 with the stop bosses 33, which are integrally formed on the lower base member 20.

A roll of tape 34 is used to splice the film, and this roll 34 is carried on a front roller 35 and a rear roller 36. The rollers 35, 36 are rotatably mounted in the upper base member 21 on a front and rear roller shafts 37, 38, respectively. The tape roll 34 may extend upwardly through the top aperture 39, which is so designed as to facilitate replacement of the tape roll 43. This aperture 39 is formed by two vertical rear wall extensions 40, 41 at the rear of the upper base member 21.

The tape is fed from roll 34 downwardly over a lower guide rod 42 and thence to the tape dispensing and feeding assembly 23 whose operation and construction will be described in greater detail hereinafter.

A second principal component of the film splicing apparatus of the present invention is the film holder unit 22. This unit is designed to hold two pieces of film in close endwise abutting relationship during the time the film has the tape applied to one surface thereof, folded over and adhered to the other surface, and cut off at the desired point. The film holder unit 22 includes mirror image left and right hand portions connected by a front connector bar 43 at the front, and by an upper operating handle 44 at the rear. The film holder unit thus has a left hand channel member 45, and a right hand channel member 46 which are about one-eighth of an inch (⅛″) deep and wide enough to accommodate the size of film desired to be spliced, that is, in the present embodiment, about 35 mm. plus a small clearance space. The channel assemblies 45 and 46 are each equipped with identical holder plates 47, 48, the bottom or film engaging surfaces of which advantageously comprise a sponge rubber or like soft and gripping material 49, 50, adapted to firmly grasp the film F and prevent its sliding and to prevent scratching it. The holder plates 47, 48, are pivotally mounted on plate rods 51, 52 and coil springs 53, 54 bias the plates in a normally open or upwardly disposed position, such as that shown in FIG. 6. The plates 47, 48 are held down, when it is so desired, by means of front hold-down clips 55, 56, which are biased by a central spring 57 with their rear locking extensions 58, 59 to a rearward position. These extensions 58, 59 retain the holder plates 47, 48 in a downward position when the extensions are engaged over the plates, and held in this position by the central spring 57.

The film holder unit 22 is designed to be reciprocable, as was referred to herein, and means for guiding the holder unit 22 in its back and forth movement, includes means in the form of alignment lugs 60 which extend downwardly from the channels 45, 46 and eyes in these lugs 60 engage longitudinally disposed guide rods 61 on either side of the upper base member 21, just below the upper surface 62 of the upper base member 21.

Movement for the holder unit 22 is supplied by having the operator pull forwardly on the upper or bight portion 63 of the upper operating handle 44. A forward motion of the bight portion 63 of the operating handle 44 causes rearward motion of the holder unit 22 about a movable pivot point formed by the connection between the upper operating handle 44 and the left and right hand connector links 64, 65. This connection is formed by the insertion of a central pivot rod 66 extending through the front end portion of the links 64, 65, while the links themselves pivot up and down about their rear pivot rod 67. A locking spring 68 forwardly biases a detent member 69 and slots 70 in the member 69 engage the locking bar 71 in the rear upper operating handle 44. Thus, in order to reciprocate the film holder unit 22 backwardly, it is necessary to push the top portion 72 of the detent member 69 backwardly, thus releasing the locking bar 71 and freeing the operating handle for its oscillating motion. The rear upper operating handle 44 is advantageously connected to the holder plates 47 and 48 by means of extensions 73 of the plate rods 51 and 52 with registering holes 74 in the lower portion of the handle 44.

One function of the movable film holder unit is to assist the completion of the splicing operation by wrapping the tape around the bottom portion of the film, and this is accomplished by moving the film and the tape onto contact with the tape folding and cutting assembly 24, described below.

The folding and cutting assembly 24 includes a lower metal or like base element 75, and on the top thereof and fixedly attached thereto, an upper contact member 76, preferably made of a plastic or other like smooth and slippery material. Disposed above the contact member 76 is a pivoted pressure element 77 in the form of an integral block, shown in FIGS. 5 and 11–13, for example. This element serves to hold both the cutting blade 78, disposed on the front thereof, and the tape depresser unit 79 including the spring steel tongue 83 therefor, as well as providing locating means for a combination pressure and adjusting screw 80. The pressure and adjusting screw 80 engages the rear compression plate 81, to force it downwardly against the tape T and the film F held in the aperture thus formed when the pressure element 77 is lowered about the pivot point 67.

The central pivot rod 66 engages the forward portion 82 of the pressure element 77, and when the pivot rod 66 moves downward vertically, the rear compression plate 81, in response to pressure from the screw 80, tightly seals the tape T over the film F at the rear edge (righthand edge as in FIGS. 11–13) portion of the film F, and the cutting blade 78 moves down to cut the tape T at the forward end thereof.

Whereas the depresser unit 79 and spring steel tongue 83 apply a firm downward force on the tape T and film F while the two are being moved backwardly in the holder to adhere the tape to the film, depresser lifters 84 (FIG. 1) are formed on the film holder 22 to lift the depresser initially over the rear adge of the tape. When the lifters 84 have passed the depresser 79, it engages the tape, and the portion of the tape and film to which no pressure was applied is contacted at the end of the cycle by the compression plate 81, as explained above. Thus, each part of the tape and film has substantial pressure applied thereto to create good adhesion, althought not all of the joint is contacted directly by the depresser 79.

Whereas, the pressure element 77 may move downwardly against the resistance of the depresser and tongue 79, 83 to cut the film, it is prevented from undue upward movement by contact with the bottom portions detent member 69. The unit is constructed and arranged so that the rearward movement of the holder 22 is substantially stopped when the downwardly moving pivot rod 66 engages the forward portion 82 of the element 77. Very slight further rear movement occurs while the blade 82 moves downwardly a short distance in cutting the film, but since the handle 44 and the links 64, 65 are nearly horizontal, at this point, the rearward movement of the film holder 22 is negligible during the cutting stroke.

In order to properly load two portions of film into the film holder unit in the desired abutting but not overlapped relationship, and especially to be able to accomplish this in the dark, as is ordinarily desired in film splicing operation of this type, a film abutment indexer assembly is provided. This indexer (shown enlarged in FIGS. 7 and 8) includes a metal base section 86, containing a longitudinal slot 87 therein, and has fixed attached to the top thereof, a plastic or other non-scratching top member 88 which contains an extension of the longitudinal slot 87. The base section 86 and top member 88 are appropriately located in the base member 21 by means in the form of subjacent supports 90. An indexing blade 91 is provided and this blade is movably mounted in the slot 87 of the abutment indexer. The blade 91 also contains two boot-shaped camming cutouts 92 through which camming rods 93 extend. The rear end portion 94 of an indexing handle 95 pushes the blade 91 upwardly and rearwardly, where it remains by reason of the shape of the camming cutouts 92, until pushed forwardly and downwardly by a release mechanism to be described later.

A front end extension 96 of the indexing handle 95 extends throught the front of the lower base portion 20 and this extension 96 is advantageously located above and the film cutter mechanism 25, so that, upon finishing a film cut, the front end extension 96 of the operating handle 95 may be pressed downwardly, thus setting the indexing blade 91 in its uppermost position, so that subsequent insertion of the film into the film receiving channels 45, 46, will achieve the desired result of placing the film segments to be spliced in a closely adjacent abutting relation, separated only by the very small thickness of the indexing blade 91.

Another principal element of the present invention is the tape dispensing and feeding assembly 23. This assembly serves the purpose of withdrawing tape T from the roll 34, raising it, and dispensing it by placing it in the precisely desired relation overlying the film to be spliced, and retracting to allow movement of the film holding unit backwardly thereover, thus returning to a rest or initial position suitable for repeating the feeding and dispensing cycle.

The tape dispensing and feeding assembly includes a number of elements which are designed to allow the tape T to be withdrawn from the roll, and then, by means of a novel scissor action to be described, placing the tape over the film with a flipping or spring action and returning to a rest position. This dispensing and feeding assembly includes a large operating handle 97 with a finger or hand grip end portion 98, a crank portion 99, and a pivotally mounted movable inner operating section 100. The inner operating section 100 includes a mounting bar 101 which is fixedly mounted relative to the operating section 100 and a feeding member 102 (best shown in FIG. 10) which includes a right side portion 103, a left side portion 104 and an end connecting portion 105. The feeding member 102 is connected to mounting bar 101 by means of a bar pivot 106. The lower end of the mounting bar 101 includes means in the form of a screw 107 for holding a lower leaf spring 108 and an indexing blade return striker 109 in the positions illustrated, for example, in FIGS. 5, 11, 12 and 13. The lower leaf spring 108 extends under the feeding pivot 110 and over the lower spring retainer 111 and thence between the two outer tape guides 112, 113. The indexing blade return striker 109 on the other hand, extends over the feeding pivot 110 and does not extend as far as either of the tape guides 112, 113, but this striker 109 is used to return the indexing blade 91 to its lowered position on contact between the striker 109 and the blade 91.

The feeding loop 102 is pivotally mounted on the mounting bar 101, but the downward biasing action of the lower leaf spring 108 tends to keep the side portions 103, 104 approximately perpendicular to the long axis of the mounting bar 101. The slight pivoting motion of the loop 102 relative to the bar 101 allows a one way feeding action of the tape T through the upper end connecting portion 105 of the feeding loop 102. The two outer tape guides 112, 113 are fitted with coil springs 115, 116 to prevent excessive surface contact between the adhesive surface of the tape and the feeding mechanism so that the tape may be advanced therethrough without sticking to the feeding loop or any portions thereof. The one way feeding action of the feeding loop 102 is accounted for by the fact that the lower spring 109 loosely contacts the tape and, because of the arrangement of the spring 108, a downward motion of spring, as shown in FIG. 5, will tightly wedge the tape T against the end connector section 105 of the feeding loop 102, thus trapping the tape T therein, whereas an upward movement of the tape relative to the spring, as shown in FIG. 5, allows the spring to move upwardly and somewhat away from the end connecting portion 105 of the feeding loop 102, and this is an important feature of the invention, for reasons which will be explained in greater detail hereinafter.

Another important element in the dispensing and feeding assembly 23 is the pair of scissor arms 117, 118, which are pivotally mounted on the feeding pivot 110 and the scissor spring 119 (FIG. 9) which biases the lower end portion 120 of the scissor arm 117 in the direction of the bar pivot 106, as seen in FIGS. 5, 12 and 13. The upper end portions 121, 122 of the arms 117, 118 include two inwardly disposed flipper springs 123, 124 for reasons which will be pointed out hereinafter. Although small coil flipper springs 123, 124 are preferred, the invention also contemplate using stiff but resilient rubber or like flippers, in place of the springs 123, 124, for the same purpose, as set forth further herein.

For moving the pivoted scissor arms 117, 118, there is included a rear movement limiting stop 126, attached to the lower inner surfaces of the upper base member 21 by screws 127 or the like, as shown in FIG. 3. The flipper springs 123, 124, or thin rubber counterparts are adapted to support the tape and prevent it from falling downwardly when the handle 44 is at its rearmost position, or a relatively low position, such as that shown in FIG. 5, but, as will be appreciated, these springs 123, 124 must allow the passage of the tape T therethrough when the tape T moves downwardly over the film F, and then, the tape must be allowed to move through the open end portion of the scissor arms when the film holder unit is moved to the rear, as shown, for example, in FIG. 13. Thus, the springs 123, 124, support the tape and hold it from falling down, and pull it backwardly to impart a flipping or spring action when the tape is released therefrom as the arms 117, 118 move upwardly, forwardly and then back, as shown in FIG. 5, and yet, allow the tape to pass therethrough, after keeping it in tension when the film holder unit 22 is moved from the position of FIG. 12 to the position of FIG. 13.

As can be seen from the operational cycle drawings of FIGS. 11, 12 and 13, after the tape T has been in place over the film F, as shown in FIG. 11, and the feeding loop 102 is moved to its forward position, the tape T is held over the film F by the hand of the operator to prevent its separation from the film, and the handle 97 is pulled completely to the rear, thus rotating the mounting bar 101 rearwardly, and returning the feeding loop 102 downwardly to the position shown in FIG. 12. The loop 102 is initially stopped by their rear stop 126, and is further lowered by contact between the bottom of the loop 102 and the fixed bottom cam 129. This leaves an intermediate segment 128 of tape T extending from the rear edge of the film F down to the feeding loop 102.

As the top portion 63 of the upper handle 44 is moved to the front and the film holder unit 22 is moved to the rear, the intermediate segment of the tape T is adhered to the under or bottom surface of the film, because the film F is moved along underneath the depresser element 79 which is under pressure from the tongue 83. As initial movement between the depresser element 79 and the member 76 takes place, the tape T is maintained under some tension, and is kept in a somwhat parallel alignment with the bottom portion of the film F by reason of the supporting action of the flipper springs 123, 124, which serve to support the intermediate segment of the tape, and to prevent any slack therein as the holder unit 22 is moved to the rear. After the film has progressed some distance into the folding and cutting assembly 24, the supporting action of the springs 123, 124 is no longer necessary and the tape passes through the springs and is brought into close contact with the bottom surface of the film and then cut off by the downward motion of the cutting blade 78 as was pointed out above.

It will thus be seen that the flipper springs 123, 124 serve the function of (a) lifting the tape end to the desired height for moving it over the film F, (b) supporting the tape T and flipping it forward, to a position overlying the film F, and (c) then supporting the intermediate segment 128 of the tape T while it is fed into the folding and cutting unit 24 before the arms 117, 118 contact the limiting stop 126 and the bottom cam 129 and return to starting position shown in FIG. 15.

When the film has been taped and the tape has been cut, as described above, the film may then be released from the holder unit 22 by pushing rearwardly on the inner ends of the front hold down clips 55, 56, which releases the holder plates 47, 48, and allows them to return to their upwardly and openly biased position by the action of the coil springs 53, 54. This opens the channels, 45, 46, for reinsertion therein of additional segments of film so that the splicing operation may be repeated as desired.

In operation, it can thus be seen that the present invention provides the means for cutting or severing portions of moving picture film with a simple downward motion of the film cutter mechanism, then urging the indexing blade 91 upward by touching the operating handle 95, then placing the film in the channels and covering the same with the holder plates. Following this, it is only necessary for an operator to move the crank handle 97 to a fully forward position, hold down on the tape thus fed, return the handle to its original position, and releasing the detent member 69 with a rearward push, pull forwardly on the rear upper operating handle 44 and return it to its original position, and then remove the spliced film from the holder 22. Each operation is readily performable without visual reference, by reason of the functioning of the tape dispensing unit and the location and mechanical operation of the various assemblies which comprise the present invention. Thus, it is never necessary to depend on visual observation in the operation of the apparatus, and it is extremely effective and precise in use.

In addition, the spliced joint thus formed is sufficiently tight to be free of the undesirable "envelopes" around the joint edges, which serve to transport developing chemicals from one bath to the next.

By reason of the construction of the depresser lifters, and the action thereof in lifting the depressers 79 when the holder 22 is initially moved backwardly, the film itself is not stressed by a pull on the tape, because the entry of the film into the folding aperture is not then resisted by the depresser action. Thus, the novel splicer unit rapidly and easily performs effective film splicing in the manner set forth above.

It will thus be seen, from the foregoing description, considered in conjunction with the accompanying drawings, that the present invention provides a new and improved apparatus for splicing of film, having novel features and advantages, and accomplishing its intended objects, including those hereinbefore pointed out and others which are inherent in the invention.

I claim:
1. An apparatus for dispensing tape and applying it to the top and bottom surfaces of two abutting sections of photographic film for splicing said film together, said apparatus comprising, in combination,
   (1) a supporting frame structure including
      (a) means for supporting a roll of splicing tape and
      (b) guide means for guiding the reciprocal movement of a film holder unit, and movably mounted on said supporting frame,
   (2) a reciprocable film holder unit including
      (a) means for holding film segments to be spliced to prevent movement thereof, and
      (b) operating handle means for reciprocating said film holder
   (3) a tape folding and cutting assembly including
      (a) upper and lower tape folding and sealing means for receiving therebetween a section of the film held by said film holder and tape applied to said film, said tape folding and sealing means including a resilient portion applying a sealing pressure to said tape when said film is disposed between said folding and sealing means,
      (b) movable tape cutting means adapted to cut said splicing tape along an edge of said film when said film is held between said upper and lower folding and sealing means,
   (4) a tape dispensing and feeding assembly disposed in said supporting frame structure, including,
      (a) a tape feeding arm and tape gripping means disposed therein, said feeding means being adapted to permit movement of tape there- through in one direction but not in the reverse direction thereof, (b) means for moving said feeding arm to advance the tape therethrough, and (c) tape guiding means mounted on said feeding arm for lifting said tape into a position overlying the film when said film is held in said film holder and for releasably holding said tape down, and maintaining tension thereon to facilitate folding thereof and adhesion thereof to said film when said film holder moves said film held therein between said folding and sealing means.

2. An apparatus as defined in claim 1 in which said film holder units include holding plates for holding said film down and channels for receiving said film, said holder plates being normally biased in an upwardy and open position, and means for releasably holding said holder plates in a downward position adjacent said film.

3. An apparatus as defined in claim 1 in which said cutting blade is attached to said upper folding and sealing means whereby said blade will cut any splicing tape disposed therebelow when said upper member is moved downwardly against the film disposed in said aperture.

4. An apparatus as defined in claim 1 in which said upper folding and sealing means includes a depresser element and a spring therefor, said spring normally biasing said depresser downwardly againt said bottom means for applying a pressure to film disposed between said depresser element and said lower means.

5. An apparatus as defined in claim 4 in which said lower folding means includes an element movably attached to said lower means and defining an aperture between said element and said lower means, said element being vertically movable in response to pressure applied thereto from said upper means, for sealing tape disposed therein against film disposed therein.

6. An apparatus as defined in claim 1 in which said means for releasably holding said tape down and maintaining tension thereon is in the form of two coil springs mounted on the upper end portions of said guide means and extending inwardly therefrom and perpendicularly thereto.

7. An apparatus as defined in claim 1 in which said means for releasably holding said tape down and maintaining tension thereon is in the form of stiff but resilient synthetic resinous holders mounted on the upper end portions of said guide means and extending inwardly therefrom and perpendicularly thereto.

8. An apparatus as defined in claim 1 in which there is included, in addition to the elements recited therein, film abutment indexing means mounted in said supporting frame structure, said indexing means comprising a thin vertically movable blade with camming surfaces therein, said blade and said camming surfaces being so constructed and arranged as to allow said blade to remain in a raised position when raised upwardly and rearwardly and to return to a lowered position when said blade is moved forwardly.

9. An apparatus for dispensing tape and applying it to the top and bottom surfaces of two abutting sections of photographic film for splicing said film together, said apparatus comprising, in combination, (1) a supporting frame structure including
 (a) means for supporting a roll of tape and
 (b) guide means for guiding the reciprocal movement of a film holder unit, (2) a reciprocable film holder unit including
 (a) two channels each for receiving said film and preventing lateral movement thereof,
 (b) hold down means for preventing vertical and longitudinal movement of said film, said hold down means being resiliently biased to an open position,
 (c) movable clips adapted to retain said hold down means against said film in one position of said clips and to release said hold down means in another position of said clips,
 (d) operating handle means connected to said channel units for reciprocating said channel units when said operating handle is moved through an arc,
 (e) a pair of film holder control links and
 (f) two pivots for said control links, one pivot being a fixed pivot connecting said links to said frame and the other pivot including a pivot rod and connecting said links to said handle means, (3) a tape folding and cutting assembly, including
 (a) a stationary base member supported in said frame structure,
 (b) a movably mounted cutting and pressure-applying member including a cutting blade attached thereto,
 (c) a depresser and spring therefor for exerting a downward pressure against said stationary base member, and for holding down tape attached to said film during folding of said tape, said cutting and pressure applying member being so constructed and arranged as to move downward in a cutting movement in response to downward pressure placed thereon by said pivot rod at the end of a reciprocating cycle of said film holder; and (4) a tape dispensing and feeding assembly including
 (a) a tape holder arm and gripping means therein designed to permit movement of tape therethrough in one direction but not in the reverse direction thereof,
 (b) means mounted on said holder arm for arcuately moving said holder arm,
 (c) two tape lifting arm means pivotally mounted on said holder arm, the ends of said lifting means extending outwardly of said tape holder arms and being oscillatable with a scissors action to either side of said tape holder arms,
 (d) flexible tape lifters mounted on said lifting arms near the ends of and extending inwardly therefrom toward each other for lifting said tape upwardly and backwardly relative to said holder arms and releasing it to an overlying relation to said film, and for releasably holding said tape down and maintaining tension thereon to start a fold therein when said film is moved rearwardly in said film holder, and
 (e) camming means mounted on said frame member for imparting an oscillating action to said lifting arms when said holder arm is oscillated in an arcuate movement.

10. An apparatus as defined in claim 9 which includes, in addition to the elements recited therein, detent means mounted on said frame structure for releasably holding said film holder at a predetermined initial position.

11. An apparatus as defined in claim 9 which includes, in addition to the elements recited therein, film abutment guide means comprising a vertically movable thin blade member with camming recesses therein, camming rods engageable in said recesses, support means for said rods and blades, lifting means and a handle therefor for lifting said blade, said camming rods and recesses being so constructed and arranged to allow upward and rearward movement of said blade into an upward rest position and to allow return of said blade when said blade is moved forward.

12. An apparatus as defined in claim 9 which includes, in addition to the elements recited therein, a tape sealing compression plate, movably disposed in said stationary base member, and defining an aperture between said base member and said plate, for applying pressure to film inserted in said aperture, in response to pressure applied thereto from said cutting and pressure-applying member.

13. An apparatus capable of operation in the dark for splicing adjacent ends of film strips by applying adhesive tape to the top and bottom surfaces thereof, comprising in combination:
(1) a frame structure;
(2) tape supporting means on said structure for supporting a roll of tape;
(3) film holding means on said structure for holding said film strips in end-to-end relation;
(4) said film holding means being mounted for reciprocal movement between first and second stations on said frame structure;
(5) tape feeding means for gripping a free end of said tape and delivering a predetermined length of tape to said film while said holding means is at said first station;
(6) actuating means for moving said holding means from said first to said second station;
(7) wrapping means for wrapping said tape around said film strip ends to effect a splice while said holding means is moving from said first to said second station;
(8) cutting means for severing said predetermined length of tape from said roll at a side edge of said film;
(9) said tape feeding means including means for:
 (a) lifting said tape into a position overlying said film while said holding means is at said first station;
 (b) releasably holding said tape under said holding means as said holding means is moved from said first to said second station;
 (c) maintaining tension on said tape to facilitate wrapping of said tape about said film.

14. An apparatus as defined in claim 13, wherein said tape feeding means includes upper and lower tape folding and sealing means for receiving therebetween a section of the film on said holding means and tape applied to said film; said tape folding and sealing means including a resilient portion applying a sealing pressure to said tape when said film is disposed between said folding and sealing means.

15. An apparatus as defined in claim 14, wherein said cutting means is attached to said upper folding and sealing means so that said cutting means will cut any tape disposed therebelow when said upper folding and sealing means is moved downwardly against the film.

16. An apparatus as defined in claim 14, wherein said upper folding and sealing means includes a depresser element and a spring therefor; said spring normally biasing said depresser downwardly against said lower means for applying pressure to film disposed between said depresser element and said lower folding and sealing means.

17. An apparatus as defined in claim 13, in which said means for releasably holding said tape and maintaining tension thereon is in the form of two resilient fingers mounted on the upper end portion of said tape feeding means and extending inwardly therefrom toward each other at opposite sides of said tape.

18. An apparatus as defined in claim 13, and including, film abutment indexing means mounted in same frame structure and comprising a thin, vertically movable blade with camming surfaces therein which are arranged and disposed to allow said blade to remain in a raised position when moved upwardly and rearwardly and to return to a lowered position when said blade is moved forwardly.

19. An apparatus for splicing adjacent end of film strips by applying splicing tape to the top and bottom surfaces of a pair of abutting film strip ends wherein the film is held on film holder means mounted on a frame structure for movement between first and second stations which include tape feeding means comprising means for:
 (a) lifting said tape into a position overlying said film while said holding means is at said first station;
 (b) releasably holding said tape under said holding means as said holding means is moved from said first to said second station;
 (c) maintaining tension on said tape to facilitate wrapping of said tape about said film.

References Cited

UNITED STATES PATENTS 3,345,238  10/1967  Vanoni _____ 156—505

DOUGLAS J. DRUMMOND, *Primary Examiner.*